A. W. WESSOLECK.
ODOMETER MECHANISM.
APPLICATION FILED JAN. 9, 1915.
1,175,210.
Patented Mar. 14, 1916.
2 SHEETS—SHEET 1.
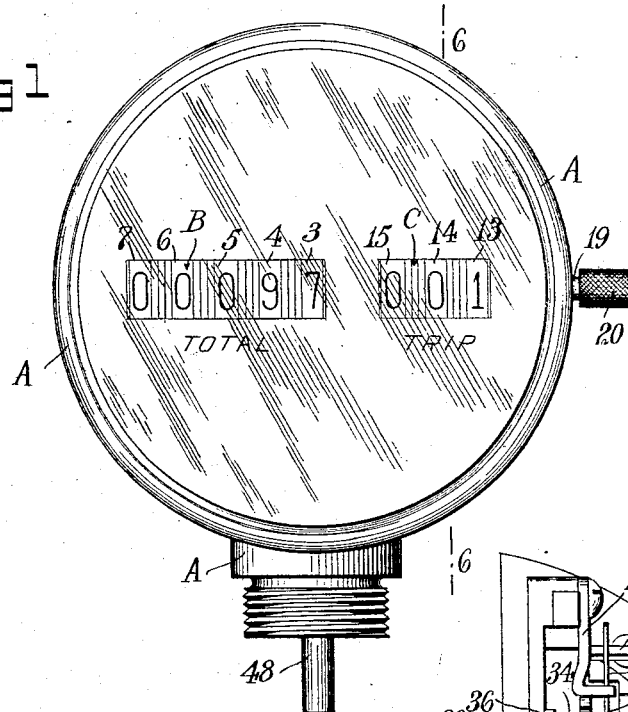
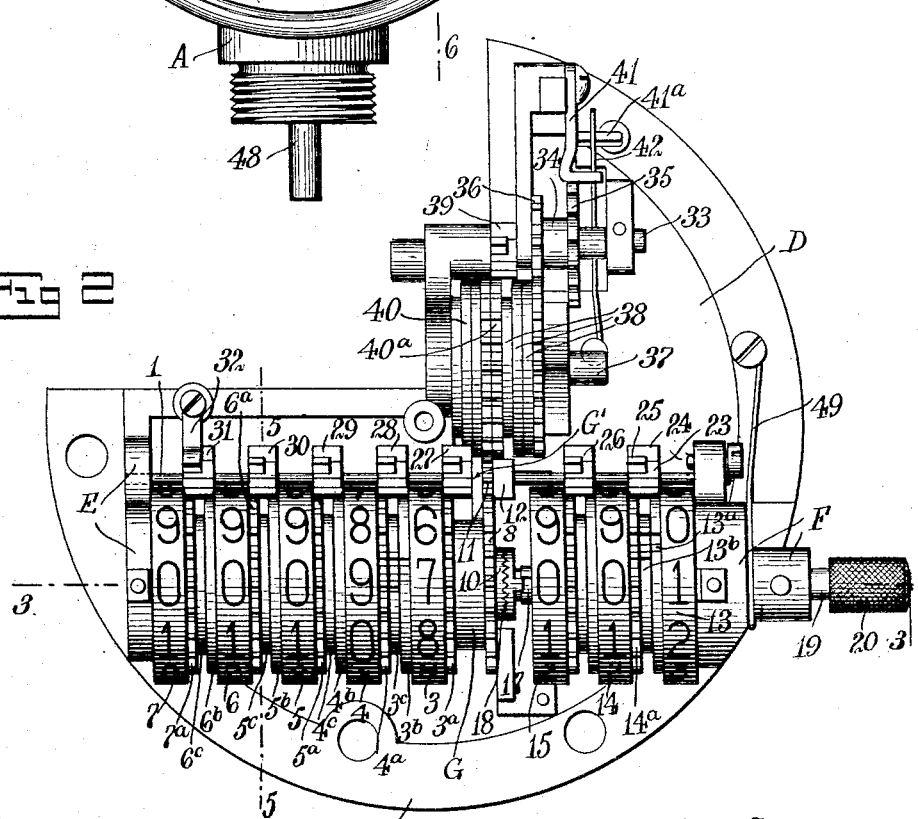
Witnesses:
Inventor
A. W. Wessoleck

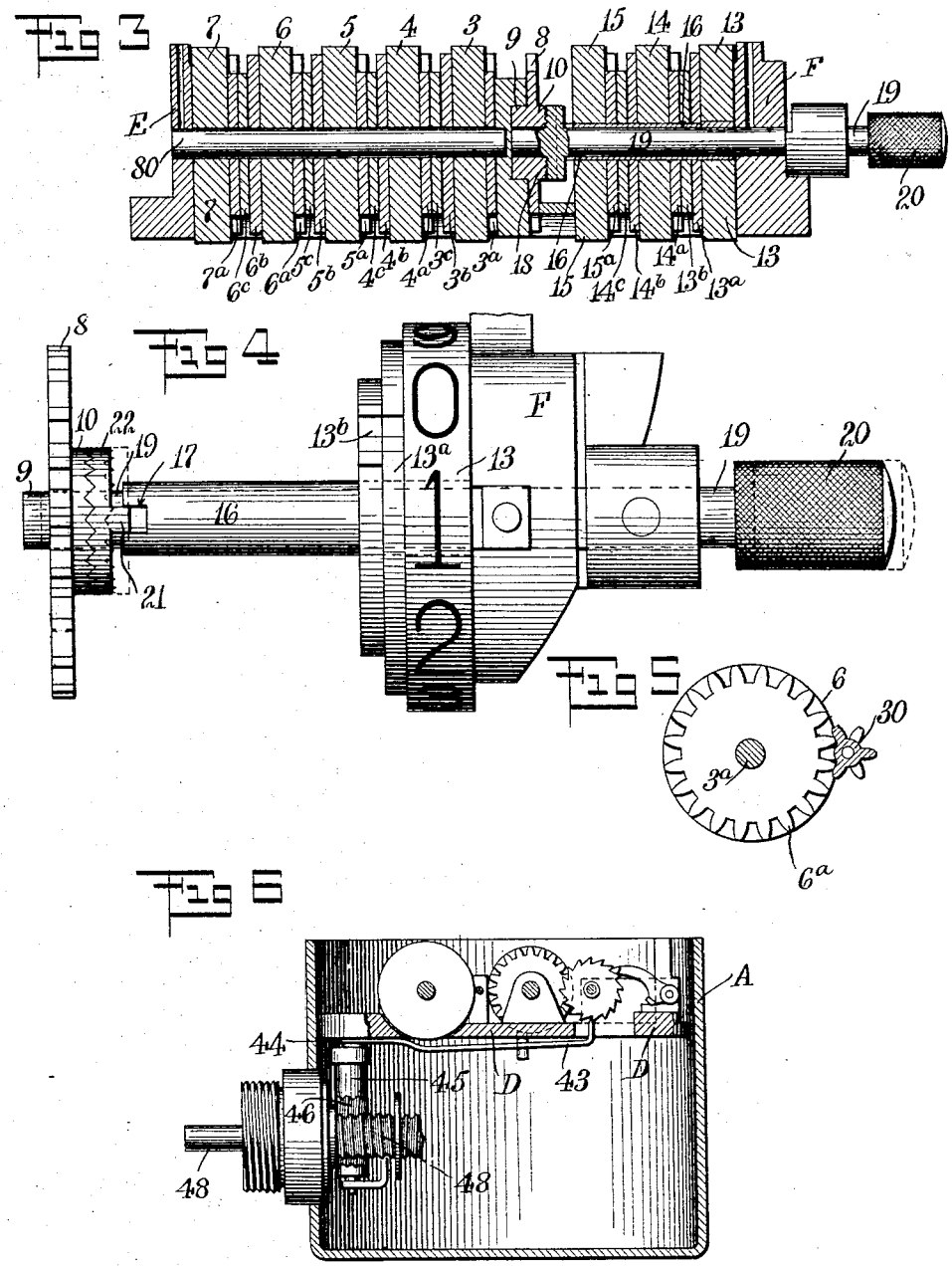

UNITED STATES PATENT OFFICE.

AUGUSTUS W. WESSOLECK, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

ODOMETER MECHANISM.

1,175,210.  Specification of Letters Patent.  Patented Mar. 14, 1916.

Application filed January 9, 1915. Serial No. 1,410.

*To all whom it may concern:*

Be it known that I, AUGUSTUS W. WESSOLECK, a citizen of the United States, residing at the city of New Britain, county of Hartford, in the State of Connecticut, have invented certain new and useful Improvements in Odometer Mechanism, of which the following is a full, clear, and exact description.

This invention relates to odometers and is designed to provide a comparatively simple and durable form of odometer mechanism.

In the drawings illustrating a preferable embodiment of the invention,—Figure 1 is a plan view of an instrument embodying the odometer mechanism which is the subject-matter of the present invention. Fig. 2 is an enlarged plan view of the odometer-train, the outer casing being removed. Fig. 3 is a transverse vertical section on the line 3—3 of Fig. 2. Fig. 4 is a fragmentary view showing details of the combined clutch and resetting mechanism. Fig. 5 is a vertical section on the line 5—5 of Fig. 2. Fig. 6 is a fragmentary vertical section on the line 6—6 of Fig. 1.

Referring to the drawings by numerals, A indicates generically an odometer casing; B a window or slot in the dial face through which the dial wheels of the total odometer mechanism are exposed to view, and C is another window or slot through which the dial wheels of the trip or trial odometer mechanism appear.

The odometer mechanism proper is mounted upon a base D and is constructed as follows: Bracket walls E and F extend vertically upward from the base D and have mounted therebetween the dial wheels and gearing train of the total and trip odometers. A central bracket G spaces the total from the trip odometer mechanism, this bracket having an extension G', through which extends a shaft or spindle 1 the ends of which are fixed in the bracket walls E and F. On this spindle are loosely journaled a series of pinions which are arranged to serially connect the dial wheels of each of the total and trip trains.

The total train comprises dial disks 3, 4, 5, 6, 7 loosely journaled on a shaft or spindle 80, whose opposite ends are mounted in the wall bracket E and intermediate bracket G of the base-plate. These dial wheels with their attached gearing are each similar except the last dial 7, which, being the one of highest numerical value, does not include the gearing for operating an adjacent dial of higher numerical value. These dial wheels, in my present embodiment, have numerals on their peripheries running from 1 to 10, the tenth numeral being "0", so that one full revolution of a dial wheel will count ten for the denomination shown by said wheel and for each complete revolution will impart to the adjacent dial wheel of a higher denomination or numerical value a one-tenth revolution, "raising" it one numeral and itself indicating zero. The initial or unit wheel of this series of dial wheels is the one numbered 3, the adjacent wheels in their order representing tens, hundreds, thousands, etc.

The temporary or trip odometer mechanism is positioned between the brackets G and F and is independent of the total distance odometer. This trip odometer mechanism is driven directly by mechanically operated driving means, by which I mean the machine, vehicle wheel or other rotating element whose revolutions are to be counted by the odometer as miles or as revolutions. To this end a gear wheel 8 provided with hubs 9 and 10 is journaled in the middle bracket G, the hub 9 or its equivalent being journaled in said bracket. This gear wheel 8 is rotated by a pinion 11 mounted on the spindle 1 between the bracket extension G' and an additional bracket 12. This pinion 11 is in turn driven from a train of mechanism mechanically operated from the machine or wheel, as will be later described. The dial wheels of the trip odometer mechanism are numbered 13, 14 and 15, the last two being freely revoluble on a hollow sleeve or shaft 16 journaled in the bracket plate F and extending beyond the dial wheel 15 to a point adjacent the hub 10 of the driving gear 8. The dial wheel 13, which is the initial or first dial of the trip odometer train, represents the lowest denomination, say, tenths of a mile, and is fixed to and revolves with the hollow sleeve or shaft 16, whereas the dial wheels 14 and 15 revolve on said sleeve. The open end of the hollow sleeve 16 adjacent the hub 10 on the driving gear 8 is provided with diametrically opposite notches 17. The adjacent face of the hub 10 is corrugated to form a clutch-face 18.

A spindle 19 extends through the hollow shaft 16 to the outside of the odometer casing and is provided with a finger-piece 20. Its inner end is formed with opposed wings 21 riding in the slots 17 and keying the spindle to the shaft or sleeve 16. The end of the spindle is provided with a clutch-face 22 coöperating with the clutch-face 18 of the gear hub. The length of the wings 21 is such that they always remain within the slot 17 thereby placing the spindle 19 in permanent rotating or driving relation with the hollow shaft 16, which carries and rotates the initial dial wheel of the trip odometer. The length of the slot 17, however, permits the spindle 19 to be moved longitudinally and to unclutch the part 22 from the coöperating clutch part 18 and thereby disconnect the mechanically operated means from the sleeve 16 and the attached initial wheel of the trip odometer. In this position the initial wheel may be freely turned by hand through the finger-piece 20 to set the initial wheel and, as will be seen later, the intergeared wheels of the trip odometer to any point desired. This is accomplished without interfering with the operation of the total odometer, as will be seen later. As the manner of intergearing the dial wheels of both the total and trip odometer mechanisms is the same in all essential particulars, a specific description of one serially intergeared action will be sufficient.

The dial wheels of the trip odometer are constructed as follows: The first dial 13, as has been stated, is fixed to and rotates with the hollow shaft 16. It comprises the main disk body 13 upon whose periphery the numerals appear; a second disk 13$^a$ of less diameter and a third disk 13$^b$ of still less diameter, these last two disks being positioned at the face side of the main disk 13 in the direction of the driving gear 8. The adjacent disk 14 on its face, adjacent these two disks, is provided with a toothed gear 14$^a$ of a diameter equal to that of the disk 13$^a$ and positioned closely adjacent the disk 13$^b$. This latter disk, 13$^b$, is provided with two gear teeth and the adjacent disk 13$^a$ is slotted in line with the space between these teeth, the teeth making all three disks of substantially equal diameter at this point. The teeth on the disk 13$^b$ correspond with the teeth on the gear disk 14$^a$ so that when these parts are alined a broad or full width pinion tooth may fit between adjacent teeth on the disks 14$^a$, 13$^b$ and into the slot cut into the periphery of the disk 13$^a$. By means of these gear teeth and slot and a motion-transmitting pinion a full revolution of the initial wheel 13 is effective to impart a one-tenth revolution to the adjacent wheel 14. This particular transmitting pinion 23 is loosely and revolubly mounted on the spindle 1 and is of a standard and known construction. It is provided with alternate broad or full width teeth 24 and narrow or short width teeth 25, the broad teeth being of a width to span and therefore extend in between the teeth on disks 14$^a$, 13$^b$ and into the slot in the disk 13$^a$, when these portions of the disks 13$^a$, 13$^b$ reach the point in their revolution where they engage a broad tooth 24 of a pinion 23. The narrow teeth 25 are of a width sufficient to engage the teeth of gear 14$^a$ and also of a width to be engaged by the teeth on the disk 13$^b$. As the initial wheel 13 is rotated, therefore, one of the teeth on disk 13$^b$ will engage first with a narrow tooth 25 (which also engages a tooth of gear 14$^a$) to turn the pinion 23 and gear 14$^a$, one tooth, and then another tooth when broad tooth 25 fits into the space between the alined teeth on gear 14$^a$, disk 13$^b$ and an alined slot in disk 13$^a$ and is turned by the continued revolution of dial wheel 13. For one revolution of the dial wheel 13, therefore, the pinion 23 will be rotated through an arc represented by a broad and narrow tooth of pinion 23. There are, in this embodiment, twenty teeth on the gear disk 14$^a$ and this gear disk will therefore be revolved to the extent of two teeth or one-tenth of a revolution, after which it will remain stationary until the teeth and slot on gears 13$^b$, 13$^a$ again engage the pinion 23 at the end of another revolution.

When the pinion is not engaged by the teeth and slot of the dial wheel 13, the broad or full width teeth will overhang the periphery of the disk 13$^a$, as seen in Fig. 5, and will lock the pinion as well as the intermeshing gear 14$^a$ against rotation. The dial wheel 14 transmits motion to the dial wheel 15 in a precisely similar manner, being provided with disks 14$^c$ and 14$^b$ corresponding in structure with the disks 13$^b$ and 13$^a$, there being a pinion 26 upon the spindle 21 similar in construction and action to the pinion 23, this pinion serving to rotate the dial wheel 15 one-tenth of a revolution to each full revolution of the dial wheel 14. The dial wheels 13, 14, 15 represent in this instance tenths of a mile, unit miles and ten miles.

The total odometer mechanism is serially geared together in all essential particulars in the same manner as the trip odometer mechanism. The initial dial wheel 3 of the total odometer carries a toothed gear 3$^a$ on the one side and slotted and toothed disks 3$^b$ and 3$^c$ on the other side, the last two in structure being the same as disks 13$^a$ and 13$^b$ of the trip dial wheel 13. The toothed gear 3$^a$ is rotated by a pinion 27 on spindle 1, this pinion being similar in structure to pinion 23 and being operated through the mechanically operated driving means, as hereinafter described. The dial wheels 4, 5 and 6 are each similar in construction to the dial wheel 3, having respectively toothed gears 4ª, 5ª and 6ª on the one face; slotted disks 4ᵇ, 5ᵇ, 6ᵇ, and the two-teeth disks 4ᶜ, 5ᶜ, 6ᶜ on the other face. The slotted and toothed disks of the dial wheel of a lower denomination are adjacent the toothed gears of the dial wheel of the next higher denomination. The dial wheel of the highest denomination, designated at 7, has a toothed gear 7ª positioned adjacent the disks 6ᵇ, 6ᶜ of the dial wheel of the next lower denomination, but itself has no toothed and slotted disks, being similar in construction to the dial wheel 15 of the trip odometer. Between the dial wheels 3 and 4, a pinion 28 is journaled on spindle 1, this pinion being similar to pinion 23 and coöperating with the gears and disks of dials 3, 4 in the same manner that pinion 23 coöperates with trip dial wheels 13, 14. Similarly there are pinions 29 and 30, of similar construction and action, journaled on spindle 1 between dial wheels 4 and 5 and 5 and 6, respectively. Between dial wheel 6 and the toothed gear 7ª of dial wheel 7 is another and similarly constructed and acting pinion 31. This last pinion is held with one of its full width teeth against the periphery of slotted disk 6ᵇ by means of a leaf spring 32 secured to a vertical flange of the base. The pressure exerted by this spring serves to hold the dial wheels in numeral alinement by taking up the back lash between the pinions and gears. One such spring is ordinarily sufficient, although, if desired, each or any other of the pinions may be supplied with one.

It will be seen that one complete revolution of dial wheel 3 by pinion 27 will, through pinion 28, rotate dial wheel 4 one-tenth of a complete revolution; one complete revolution of dial wheel 4 will, through pinion 29, rotate dial wheel 5 through one-tenth of a revolution, and so on, as will be evident.

The pinion 27 and the pinion 11 are rotated to actuate the odometer mechanisms by a train of reduction gearing intermediate the dial wheels and the wheel or other mechanism whose operation is to be measured. On a spindle 33, spaced from and substantially parallel with spindle 1, is journaled a ratchet wheel 35 whose hub 34 also carries and rotates a gear wheel 36, fixedly attached thereto. Between the spindles 1 and 33 another and parallel spindle 37 is mounted in suitable brackets and carries a rotatable disk structure 38 identical structurally with any of the intermediate dial wheel structures of the odometer mechanism, this disk 38 having a toothed gear 38ª in line with and meshing with the gear 36. A pinion 39 having full width and short width teeth and structurally identical with the pinions mounted on the spindle 1, is mounted to rotate upon a suitable spindle and is positioned at the side of the disk 38 opposite the pinion 27. It is designed to be engaged by the slotted and toothed disks on the adjacent face of the disk 38 and to be rotated thereby two teeth to each full revolution of the disk 38. This pinion 39 also meshes with a second disk 40 in construction corresponding to the disk 38, there being a preferably double-toothed gear 40ª of the usual twenty teeth meshing with the pinion 39 and turned by said pinion to the extent of two teeth for each full revolution of the disk 38 in the same manner as in the serial intergearing of the dial wheels of the odometer. At its side opposite the pinion 39, this gear 40ª meshes with the pinion 11, which in turn meshes with the gear 8 and drives the trip odometer mechanism. On its other face the disk 40 is, as before stated, similar to the disk 38 and is provided with the toothed and slotted disk sections corresponding to those of the dial wheels of the odometer mechanism. These toothed and slotted sections coöperate with the full and short width teeth of the pinion 27, and for each revolution of the disk 40 will turn said pinion 27 to the extent of two teeth, in turn rotating the initial dial wheel 3 of the total odometer a one-tenth of the revolution. Rotation of the ratchet wheel 35 will, therefore, through the intermediate train of gearing described, rotate the pinions 27 and 11 to in turn rotate the initial dial wheels of the total and trip odometers respectively. These initial dial wheels, through the system of serial intergearing heretofore described will in turn actuate the alined dial wheels of higher denominations.

The ratchet wheel 35 is provided with a pawl 41 pivoted to a flange of the base D and having an offset arm 41ª engaged by a spring 42 to hold the pawl end in engagement with the ratchet wheel teeth. This ratchet wheel is rotated through the reciprocating driving dog 43 mounted upon the under face of base D and suitably guided to engage one end with the teeth of ratchet wheel 35. The other end of this dog is mounted as an eccentric strap 44 on a counter shaft 45 having a worm gear 46 thereon meshing with the worm on a main driving shaft 48 which may be rotated in the usual or any suitable manner from the part whose rotation is to be measured. When these mechanically operated driving means are actuated, the initial wheel of the total odometer will always be turned as will be evident. The initial wheel of the trip odometer mechanism, however, will not be operated unless the clutch face 22 engages the clutch face 18 to place the gear 8 in rotary driving engagement with the hollow shaft 16 to which the initial dial 13 is secured and with which the dial rotates. Consequently if the trip odometer mechanism needs to be changed, as, for instance, when it is desired to reset it at an intermediate position, or at zero, it is only necessary to manually operate a single clutch device to both disengage the trip odometer from the mechanically operated driving means, and to rotate the initial dial wheel to reset the entire trip odometer, the single device formed by the clutch with its spindle in coöperation with the shaft 16 permitting this to be done. The resetting operation is therefore one which is accomplished with ease and minimum effort, and which also is accomplished by the use of mechanism of very similar character. The spindle 19 is preferably notched and a spring latch 49 provided to engage these notches and hold the the spindle in clutch engaged and disengaged positions.

The dial units described are shown in the drawings as being formed of seperate disk elements. These elements are of course rigidly interconnected by suitable means so that they will be in fixed relation to each other. It is of course within the scope of the invention to form these parts as a single integral structure, although from the standpoint of manufacture it is preferable to form the disks separately as shown.

While I have herein described a specific embodiment of my invention, it will be understood that various changes in scope and in relative arrangement of parts are contemplated within the spirit of the invention and the scope of the appended claims.

What I claim is:

1. In combination, a casing, a shaft mounted therewithin, a series of alined dial wheels on said shaft, means whereby said wheels are serially geared together, mechanically operated driving means for said series with manually controlled means carried by said shaft and normally connecting said driving means to the initial wheel of said series, said connecting means being operatively connected with said initial wheel and being manually operable from the exterior of said casing to disconnect the driving means from the initial wheel of the series and to drive and reset said initial wheel when the latter is disconnected from said mechanically operated driving means.

2. In combination, a casing, a shaft mounted therewithin, a series of alined dial wheels on said shaft, means whereby said wheels are serially geared together, mechanically operated driving means for said series, and a single manually operable means carried by said shaft for operatively connecting said driving means with the dial wheels of said series and movable to disconnect said driving means from the dial wheels and for driving and resetting said dial wheels when said mechanically operated driving means has been disconnected therefrom.

3. In combination, a casing, a shaft mounted therewithin, a series of alined dial wheels on said shaft, means whereby said wheels are serially geared together, mechanically operated driving means for said series, with a manually controlled mechanism carried by said shaft for operatively connecting said driving means to and disconnecting the same from the initial wheel of said series, said mechanism being in permanent rotatable driving connection with said initial wheel and being manually operable from the exterior of said casing to drive and reset said wheel when the latter is disconnected from said mechanically operated driving means.

4. In combination, a casing, a shaft mounted therewithin, a series of alined dial wheels on said shaft, means whereby said wheels are serially geared together, mechanically operated driving means for said series with a manually movable clutch element carried by said shaft and arranged in one position to operatively connect said driving means with the initial wheel of said series to drive said series, and arranged in a second position to disconnect said driving means from said initial wheel, said clutch element being in permanent driving engagement with said initial wheel and being manually operable from the exterior of said casing into said two positions and being arranged, when in said second position, to drive and reset said initial wheel and said series of dial wheels serially geared therewith.

5. In combination, a casing, a shaft mounted therewithin, a series of alined dial wheels on said shaft, means whereby said wheels are serially geared together, mechanically operated driving means for said series with a single clutch device carried by said shaft and in permanent driving engagement with the initial wheel of said series, said clutch device being manually operable from the exterior of said casing to connect said driving means to and disconnect the same from said initial wheel and also operable, when said driving means is disconnected, to manually drive and reset said initial wheel and the series of dial wheels serially geared therewith.

6. In combination, a hollow rotatable shaft, a series of dial wheels on said shaft, the initial wheel of said series being fixed to and rotating with said shaft and the other of said wheels being revolubly mounted on said shaft, with means whereby said wheels are serially geared together, mechanically operated driving means for said series including a clutch movable to connect said driving means with and disconnect the same from said shaft and initial wheel of the series, said clutch having a manually operated rotatable member extending through said hollow shaft whereby said shaft and initial wheel may be manually rotated to reset or drive, when said parts are disconnected from said mechanically operated driving means.

7. In combination, a hollow rotatable shaft, a series of dial wheels on said shaft, the initial wheel of said series being fixed to and rotating with said shaft and the other of said wheels being revolubly mounted on said shaft, with means whereby said wheels are serially geared together, a mechanically operated driving means for said series including a clutch permanently keyed to and in permanent driving engagement with said shaft and initial wheel, said clutch being manually movable to connect said driving means with and disconnect the same from said shaft and initial wheel, said clutch having a spindle for manual operation extending through said hollow shaft, said spindle, when said driving means is disconnected, being manually rotatable to rotate said shaft and drive and reset said initial wheel and the series of wheels serially geared therewith.

8. In combination, a casing, a shaft mounted therewithin, a series of alined dial wheels on said shaft, means whereby said wheels are serially geared together, a driving element for said series provided with a clutch member, a movable manually operable shaft, and a clutch member carried thereby in permanent splined relation to the units wheel of the series and arranged to be engaged with and disengaged from the clutch member of the driving element.

AUGUSTUS W. WESSOLECK.

Witnesses:
R. J. P. NUSS,
R. L. GRANT.

Copies of this patent may be obtained for five cents each, by addressing the "Commissioner of Patents, Washington, D. C."